US009571149B2

(12) United States Patent
Poon et al.

(10) Patent No.: US 9,571,149 B2
(45) Date of Patent: Feb. 14, 2017

(54) TABLET COMPUTER CASE

(71) Applicant: Griffin Technology, Inc., Nashville, TN (US)

(72) Inventors: Daniel Poon, Nashville, TN (US); Tony Ray Plunk, Fairview, TN (US)

(73) Assignee: Griffin Technology, Inc., Nashville, TN (US)

( * ) Notice: Subject to any disclaimer, the term of this patent is extended or adjusted under 35 U.S.C. 154(b) by 0 days.

(21) Appl. No.: 15/095,711

(22) Filed: Apr. 11, 2016

(65) Prior Publication Data

US 2016/0301440 A1 Oct. 13, 2016

Related U.S. Application Data

(60) Provisional application No. 62/145,064, filed on Apr. 9, 2015.

(51) Int. Cl.
*H04B 1/3877* (2015.01)
*A45C 11/00* (2006.01)
*H04B 1/3888* (2015.01)

(52) U.S. Cl.
CPC ............. *H04B 1/3877* (2013.01); *A45C 11/00* (2013.01); *H04B 1/3888* (2013.01); *A45C 2011/002* (2013.01); *A45C 2011/003* (2013.01)

(58) Field of Classification Search
CPC ..... H04B 1/3877; H04B 1/3888; A45C 11/00; A45C 2011/002; A45C 2011/003
USPC ............................................ 455/575.1–575.8
See application file for complete search history.

(56) References Cited

U.S. PATENT DOCUMENTS

| | | | | |
|---|---|---|---|---|
| 2002/0088918 A1* | 7/2002 | Uto | ........................ | F16M 11/10 248/688 |
| 2005/0264988 A1* | 12/2005 | Nicolosi | ............... | G06F 1/1626 361/679.44 |
| 2011/0074257 A1* | 3/2011 | Li | .......................... | F16M 13/00 312/223.1 |
| 2012/0125791 A1* | 5/2012 | Parker | .................... | F16M 11/10 206/45.2 |
| 2014/0262854 A1* | 9/2014 | Chen | ...................... | A45C 11/00 206/45.24 |
| 2014/0332418 A1* | 11/2014 | Cheung | .................. | F16M 11/10 206/45.2 |
| 2015/0349830 A1* | 12/2015 | Lai | ....................... | H04B 1/3877 455/575.4 |

* cited by examiner

*Primary Examiner* — Michael Mapa
(74) *Attorney, Agent, or Firm* — Hornkohl Intellectual Property Law, PLLC; Jason L. Hornkohl

(57) ABSTRACT

A device case for a portable electronic device includes a device stand attached to a back surface of the case housing. The device stand is formed by an inner stand and outer stand connected by releasable hinged connections to the back surface of the case housing. A track is formed on a surface of the outer stand that the inner stand slides along. A locking portion such as a cavity or channel on the outer stand locks the inner stand into an open position with respect to the outer stand. At least a portion of the outer stand is flexible such that applying a threshold pressure to the device case causes the portion of the outer stand to flex such that the locking portion releases the inner and outer stand from the open position without damaging the stand.

8 Claims, 5 Drawing Sheets

TABLET COMPUTER CASE

CROSS-REFERENCES TO RELATED APPLICATIONS

The present Utility patent application is based upon and claims priority from U.S. Provisional Patent Application No. 62/145,064 filed Apr. 9, 2015 entitled "Tablet Computer Case".

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

Protective device cases are often used to protect mobile phone and tablet computers. Borne of these protective cases have built in stands that allow the device to be supported at an angle on a flat surface. Typically, these stands have fold out legs that support the device. Unfortunately, when pressure is applied to the device case with the stand legs extended, the legs tend to break off destroying the functionality of the case. Therefore, what is needed is an improved protective device case with an incorporated stand.

BRIEF SUMMARY OF THE INVENTION

A device case for a portable electronic device includes a case housing that encloses the portable electronic device. A device stand is attached to a back surface of the case housing. The device stand is constructed from an inner and outer stand connected by hinged connections to the back surface of the case housing. The inner stand and outer stand are preferably connected to the back surface of the device case by a releasable hinged connection such that the inner and outer stand can separate from the device case without breaking. The inner stand is most preferably connected to the back surface of the device case by hinge protrusions on the inner stand that are inserted into hinge holes in the back surface of the device case such that the inner stand can separate from the device case without breaking. The outer stand is most preferably connected to the back surface of the device case by compressible protrusions that engage hinge slots on the back surface of the device case such that the outer stand can separate from the device case without breaking. A track is formed on a surface of the outer stand and the inner stand slides along the track. A locking portion on the outer stand locks the inner stand into an open position with respect to the outer stand. The locking portion can be a channel into which a portion of the inner stand rests or bumps on a surface of the outer stand that form a cavity into which a portion of the inner stand rests. At least a portion of the outer stand is flexible such that applying a threshold pressure to the device case causes the portion of the outer stand to flex such that the locking portion releases the inner stand and the outer stand from the open position. The outer stand can have slots which allow a portion of the outer stand to flex and release the inner stand and the otter stand from the open position.

DETAILED DESCRIPTION OF THE INVENTION

The present protective device case design has a number of novel features that distinguish it from prior mobile electronics device cases. The features generally relate to a stand on the back of the case having "fail-safe" locking mechanisms that disengage under a threshold amount of pressure such that the components of the stand are not broken when excessive pressure is applied and can easily be reassembled.

Figure 1:
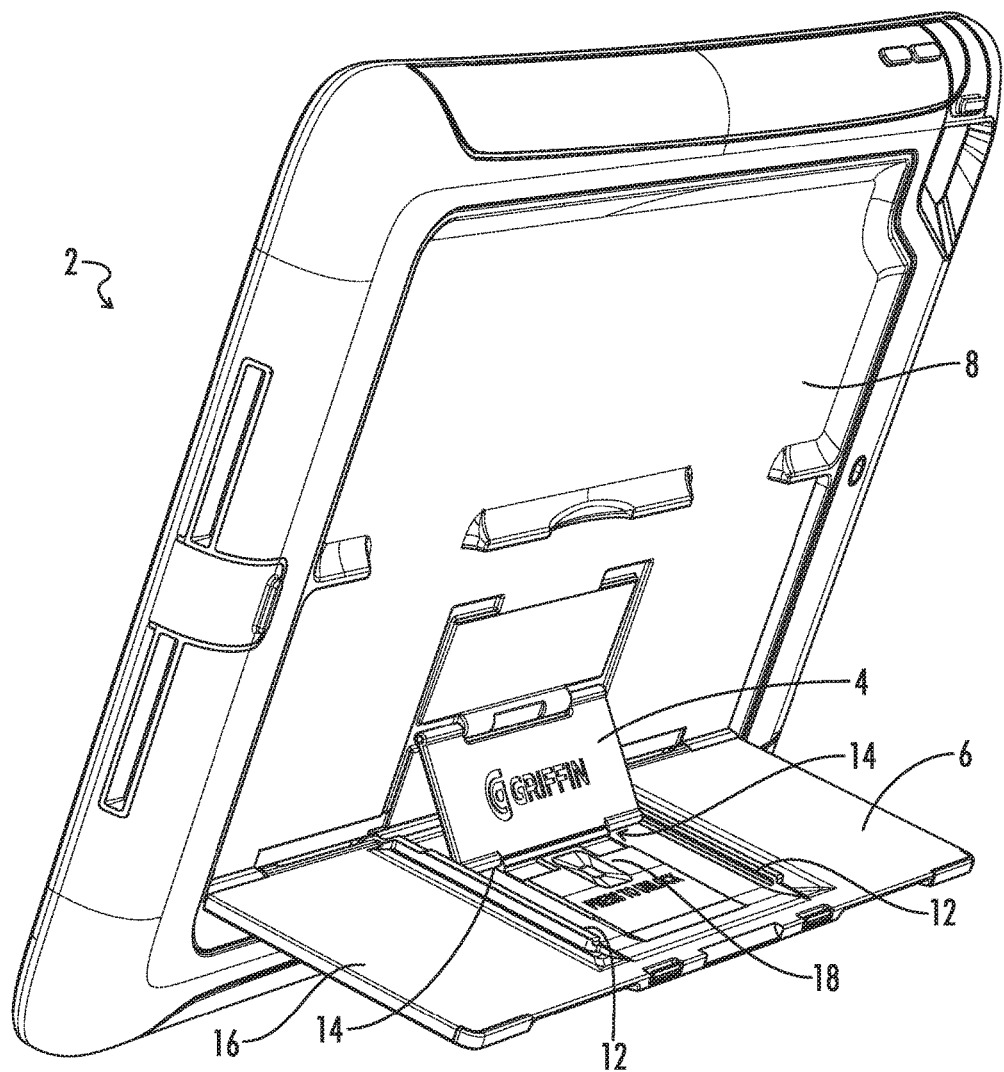
FIG. 1 is an illustration of a back view of protective device case constructed in accordance with an embodiment of the present invention, with the stand locked in the open position.

Referring now to FIG. 1, an illustration of a back view of a protective device case 2 constructed in accordance with an embodiment of the present invention with the stand locked in the open position is shown. The case 2 includes an inner stand 4 and an outer stand 6 which are hinged to a back surface 8 of the case 2 that encloses a mobile electronic device. The inner stand 4 slides along tracks 12 formed on an inside surface of the outer stand 6, allowing the inner 4 and outer stand 6 to alternate between a closed position and an open position.

In the open position, the inner stand 4 rests in channels 14 on the inside surface 18 of the outer stand 8 which lock the inner stand 4 in place during use. When a threshold amount of force is exerted on an unlock mechanism 18 or the device case 2 itself, two slots 42 and 44, discussed and illustrated in more detail below with respect to FIG. 4, formed in the outer stand 6 allow the locking portion 18 to flex downward thereby releasing the inner stand 4 from the channels 14 and closing the stand before the exerted pressure breaks the structure of the stand itself.

Figure 2:
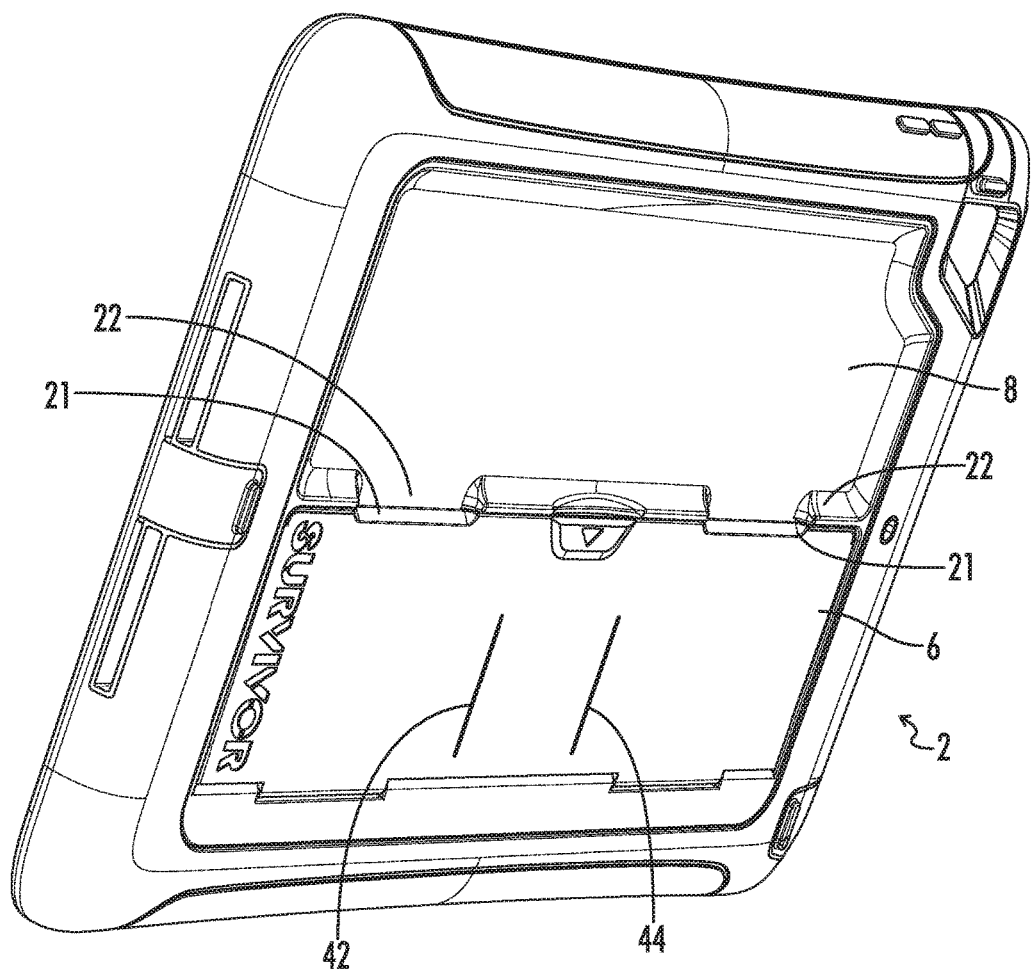
FIG. 2 is an illustration of a back view of the protective device case of FIG. 1 with the stand closed.

FIG. 2 is an illustration of a back view of the protective device case 2 of FIG. 1 with the stand closed. To close the stand, a user simply applies a threshold pressure to the device case 2 which causes the stand to automatically collapse and release from the open position. The inner stand 4 folds under the outer stand 8. Connectors 21 on the edge of the outer stand 6 snap onto projections 22 on the back surface 8 of the case 2 such that both the inner stand 4 and the outer stand 6 are secured against the case back in the closed position.

Figure 3:
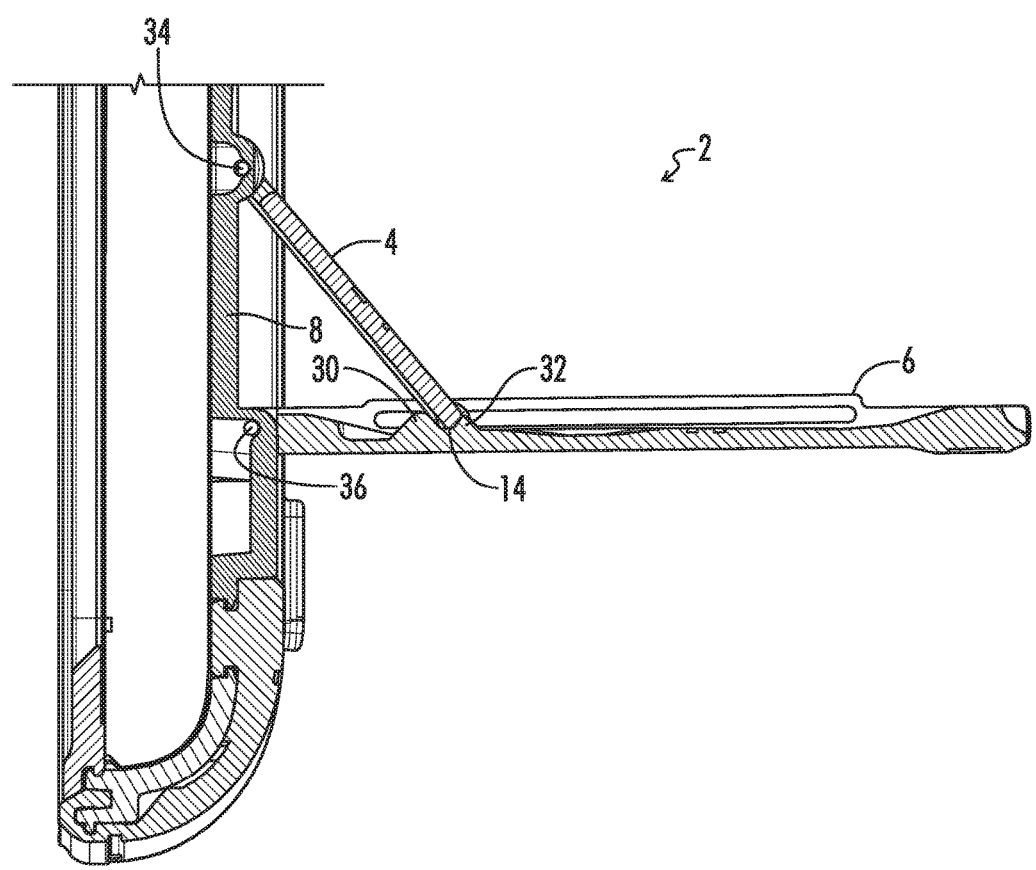
FIG. 3 is an illustration of a cross sectional side view of the device case of FIG. 1.

Referring now to FIG. 3, an illustration of a cross sectional side view of the device case of FIG. 1 is shown. The outer stand 6 has bumps 30 and 32 that form a channel 14 that the edge of the inner stand 4 rests in when the stand is in the open position. The bumps 30 and 32 function as a locking mechanism which locks the inner stand 4 into position with respect to the outer stand 6. The inner stand 4 and outer stand 6 are connected to the back surface 8 of the device case 2 with hinged connections 34 and 36 that allow them to pivot about the connections.

Figure 4:
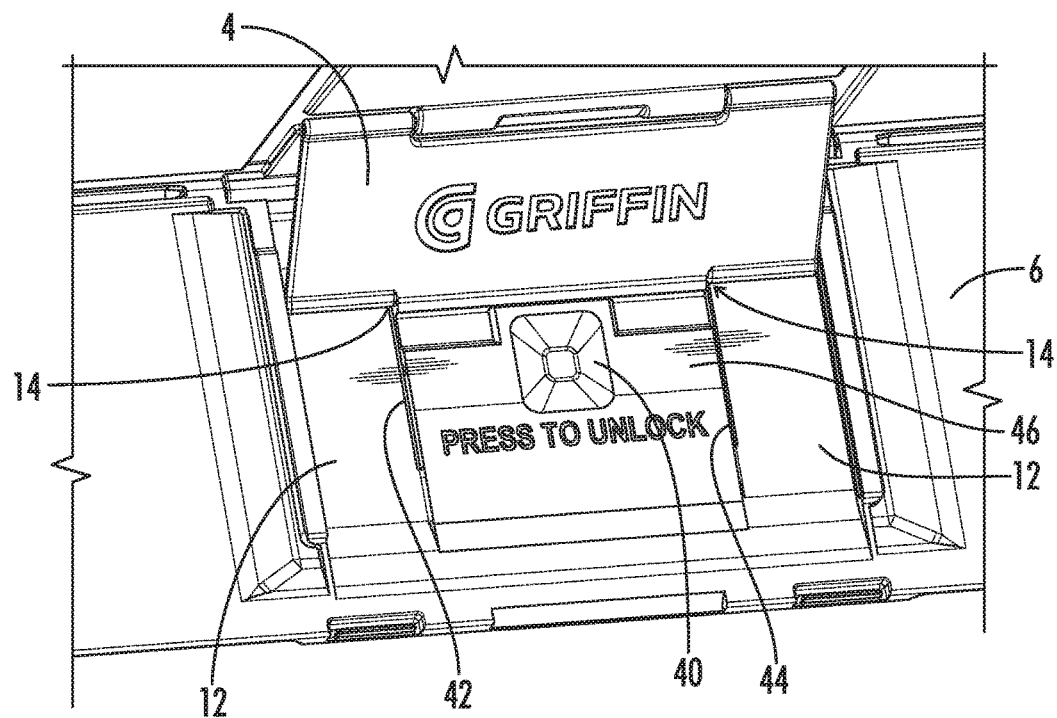
FIG. 4 is an illustration of a close up view of the inner and outer stand of the device case of FIG. 1.

Referring now to FIG. 4, an illustration of a close up view of the inner 4 and outer stand 6 of the device case 2 of FIG. 1 is shown. An unlock button 40 is formed on the surface of outer stand 4. Slots 42 and 44 are formed in the outer stand 8 which allow the locking portion 48 to flex downward and release the inner stand 4 from the channels 14 in the slidable tracks 12 of the outer stand 8 and, thus, disengage the stand from the open position.

FIGS. 5(A)-5(D) are illustrations of the preferred releasable friction fit hinges of a protective device case constructed in accordance with an embodiment of the present invention. Both the hinges 50 and 52 of the inner stand 4 and the hinges 54 and 58 of the outer stand 8 are friction fit connections that are designed to release from the device case when a threshold level of force is applied to the hinges. The breakaway, friction fit hinges 50, 52, 54 and 56 prevent forces applied from the side, which do not force the inner stand out of the locking channels, from causing the structure of the inner stand 4 or outer stand 6 to break.

Figure 5A:
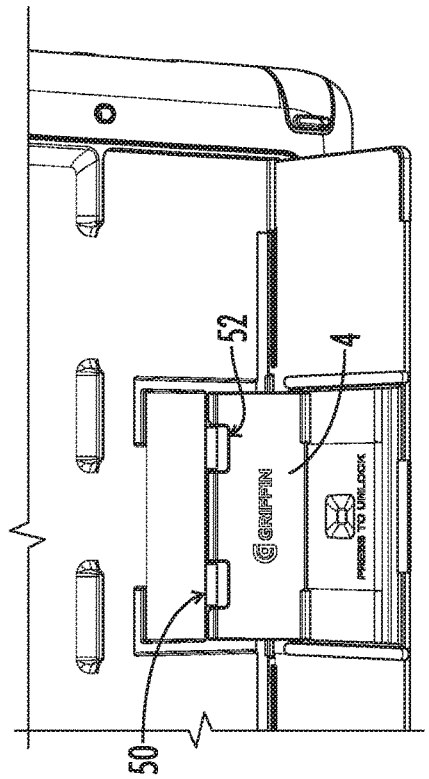
FIGS. 5(A)-5(D) are illustrations of the releasable friction fit hinges of a protective device case constructed in accordance with an embodiment of the present.
Figure 5B:
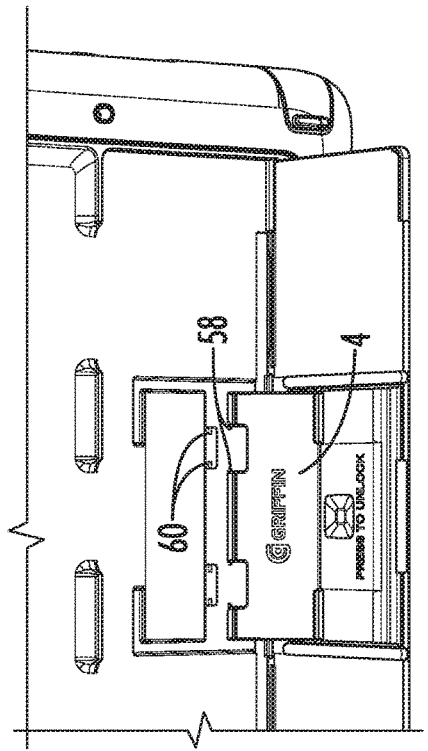

FIG. 5(A) shows the friction fit hinges 50 and 52 of the inner stand 4 connected to the back panel of the device case. FIG. 5(B) shows the friction fit hinges 50 and 52 of the inner stand 4 disengaged from the back panel of the device case. The inner stand hinges consist of hinge protrusions 58 on the inner stand 4 that fit in hinge holes 80 on the case back. The inner stand 4 is constructed from a flexible plastic such that, when pressure is applied, even a twisting pressure, the hinge protrusions 58 disengage from the hinge holes 60 and release the inner stand 4 from the case. Once removed, the inner stand 4 can be simply snapped back on the case by pushing the hinged protrusions 58 back into the hinge holes 60 by flexing edges of the flexible inner stand.

Figure 5C:
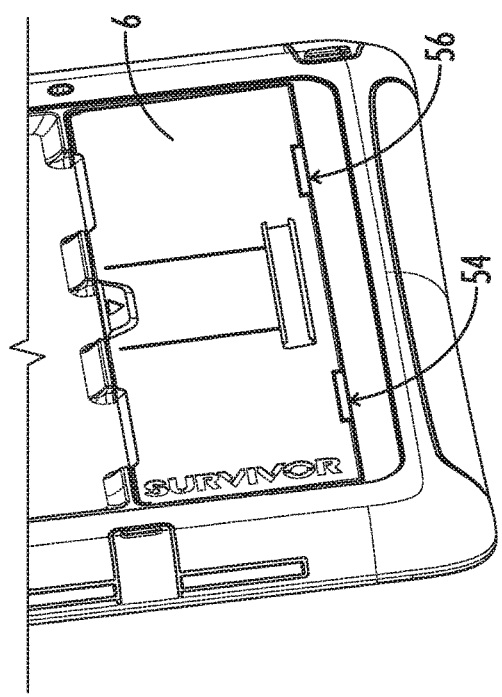
Figure 5D:
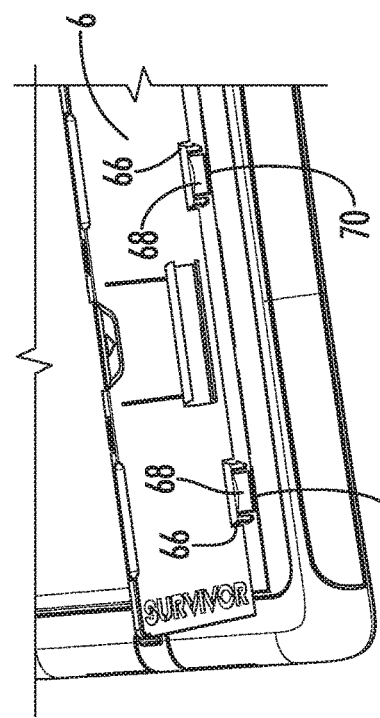

FIG. 5(C) shows the friction fit hinges 54 and 56 of the outer stand 6 connected to the back panel of the device case. FIG. 5(D) shows the friction fit hinges 54 and 58 of the outer stand 6 disengaged from the back panel of the device case. The outer stand hinges 54 and 58 consist of hinge pins 68 attached to compressible protrusions 68 that fit in securely into hinge slots 70 in the case back. The compressible protrusions 68 friction fit in the hinge slots 70 is such that, when a threshold pressure is applied, even a twisting pressure, the compressible protrusions 88 disengage from the hinge slots 70 and release the outer stand 6 from the case. Once removed, the compressible protrusions 68 can simply be pressed back into the hinge slots 70 to reengage the outer stand 6 to the case back.

Although there have been described particular embodiments of the present invention of a new and useful Tablet Computer Case, it is not intended that such references be construed as limitations upon the scope of this invention except as set forth in the following claims.

We claim:

1. A device case for a portable electronic device, said device case comprising:
   a case housing that encloses said portable electronic device;
   a device stand attached to a back surface of said case housing, said device stand comprising:
   an inner stand connected by a hinged connection to said back surface of said case housing;
   an outer stand connected by a hinged connection to said back surface of said case housing;
   a track formed on a surface of said outer stands wherein said inner stand, slides along said track;
   a locking portion on said outer stand that locks said inner stand into an open position with respect to said outer stand;
   an unlock button formed on the surface of the outer stands; and
   wherein at least a portion of said outer stand is flexible such that applying a threshold pressure to said unlock button causes said portion of said outer stand to flex downward such that said locking portion releases said inner stand and said outer stand from said open position.

2. The device case of claim 1 wherein said locking portion further comprises a channel into which a portion of said inner stand rests.

3. The device case of claim 1 wherein said locking portion further comprises bumps on a surface of said outer stand that form a cavity into which a portion of said inner stand rests.

4. The device case of claim 1 further comprising slots in said outer stand which allow a portion of said outer stand to flex and release said inner stand and said outer stand from said open position.

5. The device case of claim 1 wherein said inner stand is connected to said back surface of said device case by hinge protrusions on said inner stand that are inserted into hinge holes in said back surface of said device case such that said inner stand can separate from said device case without breaking.

6. The device case of claim 1 wherein said outer stand is connected to said back surface of said device case by compressible protrusions that engage hinge slots on the back surface of said device case such that said outer stand can separate from said device case without breaking.

7. The device case of claim 1 wherein said inner stand is connected to said back surface of said device case by a releasable hinged connection such that said inner stand can separate from said device case without breaking.

8. The device case of claim 1 wherein said outer stand is connected to said back surface of said device case by a releasable hinged connection such that said outer stand can separate from said device case without breaking.

* * * * *